United States Patent [19]
Baczkowski et al.

[11] Patent Number: 5,380,078
[45] Date of Patent: Jan. 10, 1995

[54] RETRACTABLE GLOVES FOR HANDLING OBJECTS IN ISOLATION

[75] Inventors: Carole A. Baczkowski; Margaret A. Goldwater, both of Elkton, Md.; Celia R. Ingram, Newark; Douglas B. McKenna, Wilmington, both of Del.; Evelyn C. Yurcovic, Elkton, Md.

[73] Assignee: W. L. Gore & Associates, Inc., Newark, Del.

[21] Appl. No.: 81,459

[22] Filed: Jun. 22, 1993

[51] Int. Cl.6 .............................................. A61G 11/00
[52] U.S. Cl. ................................................ 312/1; 2/162
[58] Field of Search ..................... 312/1; 2/160, 161.6, 2/161.7, 165, 166, 169

[56] References Cited
U.S. PATENT DOCUMENTS

| 312,518 | 2/1885 | Schoenhof | 2/216 |
|---|---|---|---|
| 2,558,533 | 6/1951 | Bell . | |
| 2,842,773 | 7/1958 | Trexler | 312/1 |
| 3,099,015 | 7/1963 | Renehan | 312/1 |
| 3,511,547 | 5/1970 | Schmieder . | |
| 4,141,609 | 2/1979 | Eisert . | |

Primary Examiner—Kenneth J. Dorner
Assistant Examiner—Gerald Anderson
Attorney, Agent, or Firm—Gary A. Samuels

[57] ABSTRACT

Retractable clean room or glove box gloves are described in which the retractable property is imparted by a series of longitudinal elastic strips located in the sleeve of the glove.

2 Claims, 2 Drawing Sheets

RETRACTABLE GLOVES FOR HANDLING OBJECTS IN ISOLATION

FIELD OF THE INVENTION

This invention relates to a glove for handling objects in a closed chamber such as a glove box, isolation chamber or mini-environment.

BACKGROUND OF THE INVENTION

In glove box isolation chamber operations, or in mini-environments, samples need to be maintained inside but also need to be manipulated. In order to keep the chamber "clean," i.e., free of contaminant particles, the person, or operator, handling and manipulating the samples is isolated from the chamber and the manipulations are carried out by means of gloves affixed to openings in a wall of the chamber.

In operation, the operator inserts his hands and arms into the gloves and extends them into the chamber to carry out the manipulations desired.

One such arrangement is described in U.S. Pat. No. 3,511,547 to Schnieder. The glove is prevented from extending too far into the chamber by a coiled spring affixed to the glove. The spring is located on the outside of the chamber. In operation, as the arm of the operator moves into the glove and into the clean area, the spring is compressed by the force, and limits the extent to which the glove can be inserted. It also causes the glove to retract on removal of the force.

Normally, gloves of this type are cumbersome and as the operators arms are withdrawn, the glove drops down and hangs limply from the wall. This causes a hazard since the limp glove can fall against product, equipment or chemicals in the chamber.

SUMMARY OF THE INVENTION

In this invention, the above-described problems are overcome by providing retractable gloves in which the retraction is provided by elastic strips located longitudinally along the sleeve of the glove. In more detail, one aspect of the invention is a retractable clean room glove comprising a hand portion, and a sleeve portion connected to the hand portion;

the hand portion being elastomeric so as to adapt to fit tightly over a hand;

the sleeve portion shaped to receive an arm, the sleeve portion having a series of stiff concentric rings affixed inside the sleeve spaced circumferentially and of progressively larger diameter from a wrist area to a shoulder area in order to provide ease of entry of an arm, the rings being connected by a series of spaced elastic strips running from the ring nearest the wrist to a ring near the elbow, said strips constructed and arranged to hold the sleeve in a retracted position at rest.

DESCRIPTION OF THE INVENTION

Figure 1:
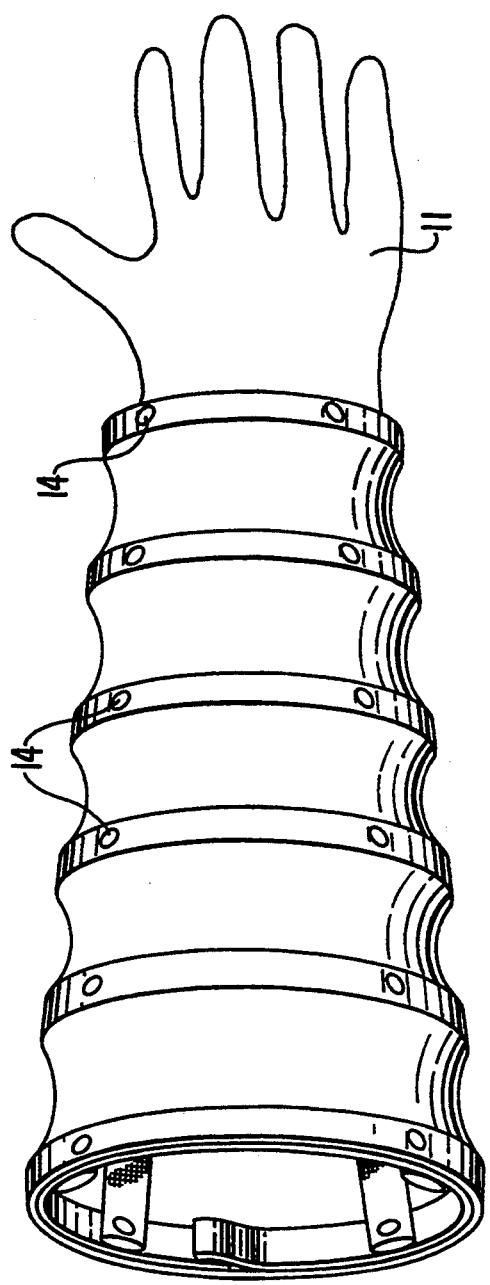
FIG. 1 is a three dimensional view of a glove of the invention.

Referring to the drawings, the glove comprises hand portion 11 and sleeve portion 12. The hand portion is elastomeric to fit tightly on the hand of an operator. While any elastomeric fabric is acceptable, Lycra ® spandex is preferred. The sleeve portion can be made of the same material.

Preferably the Lycra spandex is laminated to or coated with polytetrafluoroethylene in order to provide a non-linting, easily cleaned surface. Because of its stretch properties, one preferred coating or laminating material is expanded porous polytetrafluoroethylene.

Hoops, or ring members, 13 are inserted inside the sleeve at suitably spaced intervals. These hoops act to hold the sleeve apart and are arranged to be progressively larger as the sleeve construction becomes enlarged. The hoops, also called boning rings, are made of stiff polyester material (Rigilene sew-through polyester bonding). Thus a hand and arm is more easily inserted. Fasteners 14 are located on the hoops in radial sequence from hoop to hoop. In a preferred embodiment, the fasteners will be snaps. Strips 15 of elastomeric material (Trim Treads Inc.), are likewise equipped with mating snaps so that the strips can be snapped in place on the hoops. Thus when an operators arm is inserted into the glove, the elastomeric strip 15 stretch; and when the arm is withdrawn, the elastomeric strips retract, thus causing the glove to retract.

A specific procedure of making the retractable glove is to take a sheet of stretch Lycra spandex knit that has been laminated to a sheet of expanded porous polytetrafluoroethylene that has a coating of a water vapor permeable polyurethane on it, and to cut out a hand front piece, a hand back piece and a thumb piece. Sleeve portions are also cut out.

With the knit side out, the hand front and hand back are sewn together with a $\frac{3}{8}$ inch seam allowance. All seams were stitched using polyester V-30A thread from Hemingway and Bartlett Co. The seams began and ended with a back tack stitch. With knit side out, the thumb is stitched to hand front and back. Then starting at the wrist, seam tape is placed on the outside hand and finger sewn seams on membrane side. With knit side out the sleeve cut outs are sewn together with overlock stitching. Starting at wrist area, seam tape is placed on the outside sleeve seams on the membrane side. The glove is turned inside out and marked on the knit side for the positioning of polyester boning rings. The positioning depends on the number of rings. The polyester boning strips were 12 millimeters wide. For accommodating an arm, 6 rings, 5 inches apart are preferred. Using the markings as a guide, the boning strips were placed onto the knit side, and attached to the sleeve by heat sealing creating a ring. The boning ends are overlapped by 1 inch. Seam tape was placed over the top of the boning. Four sockets, size P-6 white Delrin plastic snaps (Kane-M) were then attached on each boning ring (centered on the boning). The snap placement, ring to ring, should be aligned from the upper sleeve opening to the wrist. Next strips of polyester knit $1\frac{1}{2}$ inch wide and at least 30 inches long were cut and folded over to create a tube. The sides were then locked. The tube was turned so that the seam is on the inside; and then a $\frac{1}{4}$ inch wide elastic strip having about 100 percent stretch was inserted into polyester knit tubes. In order to give full elongation of elastic, the elastic is inserted into tube and stitched at one end. The unattached end of elastic is pulled to its maximum length and secure to polyester tube. Four elastic tubes were made. Size P-6 white Delrin plastic snaps were attached to one end of encased elastic tube and studs were attached to the matching socket on the boning ring closest to the sleeve opening. The elastic tube was extended to maximum length towards wrist and marked where the other studs are to be attached. Remaining studs were attached to marked areas. This procedure was repeated with remaining three elastic tubes. An elastic gasket was used for attachment of sleeve to glove box. ⅛ inch elastic cording was used, cut to a length depending on the glove box opening size. To ensure tight closure the cording should be approximately ⅜ inch smaller than the opening. The ends are secured by butting ends together and repetitively sewing back and forth. The elastic gasket is placed at the sleeve opening, folded over the gasket about ⅜ inch and stitched close to the elastic gasket.

Figure 3:
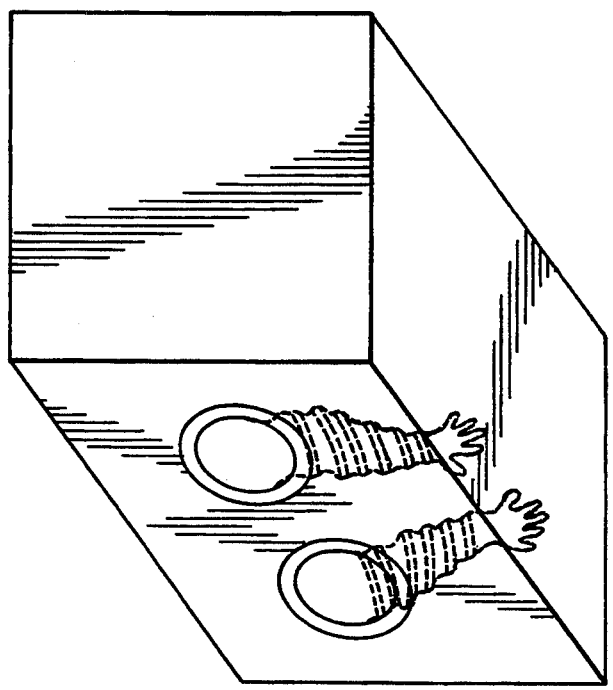
FIG. 3 is a cut-away view of a glove box to which gloves are attached.
Figure 2:
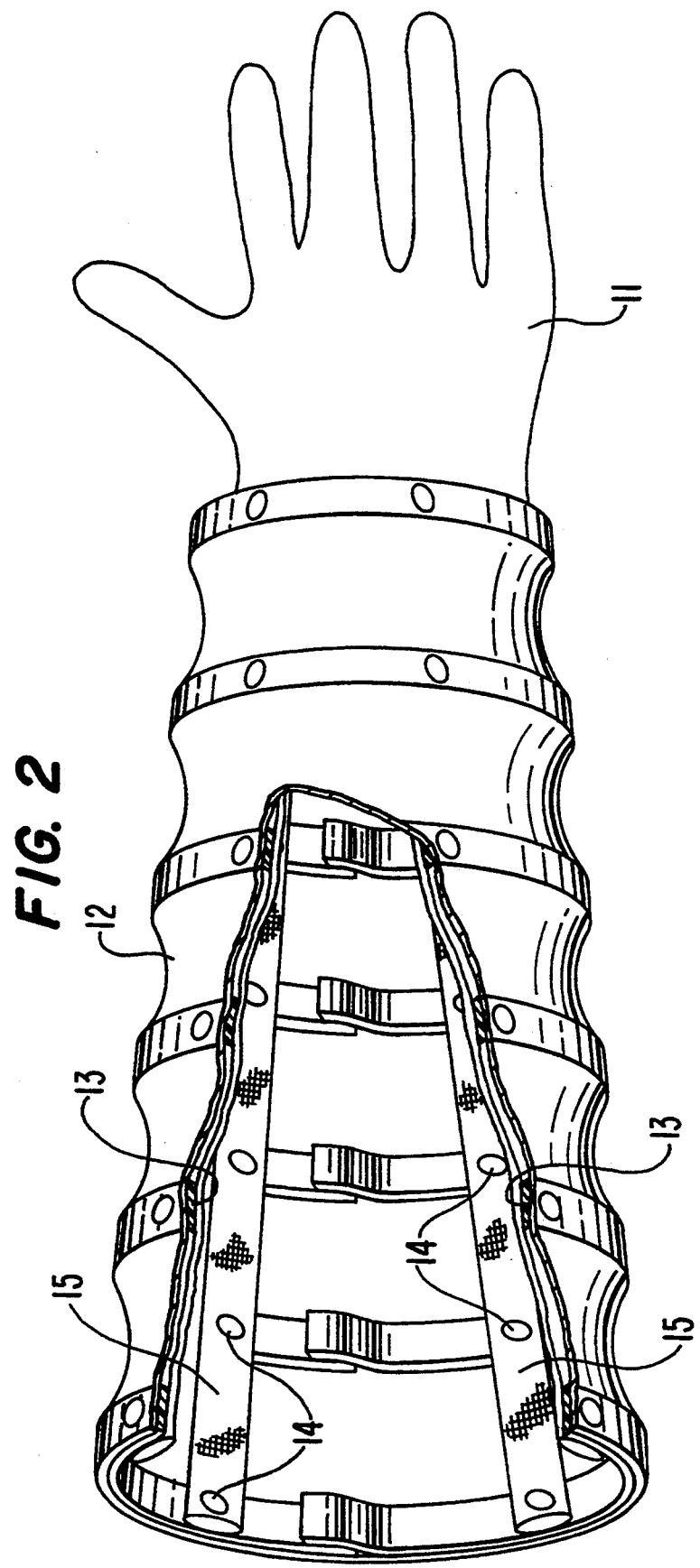
FIG. 2 is a cut-away view of the glove of FIG. 1 showing the inside of the glove.

The gloves can be used in glove box configurations, which isolate product or equipment from operators and the outside environment. The gloves can be attached to a port in the wall of the enclosure and allow manual manipulation of product and/or equipment while maintaining isolation. An advantage of the gloves is that when not in use, the gloves are in a retracted position, close to the chamber wall and away from producer equipment as shown in FIG. 3. The retractable position is created by elastic attached to flexible rings inside the glove, as explained above. The benefits of the retracting mechanism are that it prevents gloves from becoming damaged or causing damage to equipment or product. Since the boning rings are seam sealed onto the inside of the glove the gloves can be cleaned in a washer. In addition, the elastic is attached by snaps, allowing for easy replacement or repair. The rings also keep the gloves' sleeves open, making it easier for the person to put the gloves on and take the gloves off. Tension, caused by the elastic, also helps keep small hands from slipping out of glove when worn.

We claim:

1. A retractable glove for handling objects in a closed chamber comprising a hand portion and a sleeve portion connected to the glove portion;

the hand portion being elastomeric so as to adapt to fit tightly over a hand;

the sleeve portion shaped to receive an arm, the sleeve portion having a series of stiff concentric rings affixed inside the sleeve spaced circumferentially and of progressively larger diameter from a wrist area to a shoulder area in order to provide ease of entry of an arm, the rings being connected by a series of spaced elastic strips running from the ring nearest the wrist to a ring near the elbow, said strips constructed and arranged to hold the sleeve in a retracted position at rest.

2. A glove box in which gloves are attached to one wall of the glove box, said gloves comprising a hand portion and a sleeve portion connected to the glove portion;

the hand portion being elastomeric so as to adapt to fit tightly over a hand;

the sleeve portion shaped to receive an arm, the sleeve portion having a series of stiff concentric rings affixed inside the sleeve spaced circumferentially and of progressively larger diameter from a wrist area to a shoulder area in order to provide ease of entry of an arm, the rings being connected by a series of spaced elastic strip running from the ring nearest the wrist to a ring near the elbow, said strips constructed and arranged to hold the sleeve in a retracted position at rest.

* * * * *